United States Patent [19]

Grant

[11] Patent Number: 4,514,055
[45] Date of Patent: Apr. 30, 1985

[54] INFORMATION TRANSFERRING SYSTEMS OPERATING ON A RECORDING MEDIUM

[75] Inventor: Frederic F. Grant, Bellflower, Calif.

[73] Assignee: Bell & Howell Company, Chicago, Ill.

[21] Appl. No.: 459,441

[22] Filed: Jan. 20, 1983

[51] Int. Cl.³ .............................................. G02B 27/17
[52] U.S. Cl. .................................. 350/6.3; 350/320; 358/292; 29/121.6
[58] Field of Search .................. 350/6.1–6.4, 350/320, 412; 358/292, 285, 293, 205, 204; 355/55; 29/120, 121.1, 121.6, 122

[56] References Cited

U.S. PATENT DOCUMENTS

| | | |
|---|---|---|
| 1,735,335 | 11/1929 | Owens . |
| 1,865,055 | 6/1932 | Case . |
| 3,191,263 | 6/1965 | Kuehn ..................... 29/122 |
| 3,314,075 | 4/1967 | Becker et al. . |
| 3,324,478 | 6/1967 | Jacobs . |
| 3,463,882 | 8/1969 | Herbold . |
| 3,501,589 | 3/1970 | Russell . |
| 3,654,624 | 4/1972 | Becker et al. . |
| 3,851,951 | 12/1974 | Eveleth . |
| 3,874,621 | 4/1975 | Blair et al. . |
| 3,962,688 | 6/1976 | Westerberg . |
| 4,168,506 | 9/1979 | Corsover . |

OTHER PUBLICATIONS

Daniel M. Costigan, *The Principles of Facsimile Communication* (Chilton Book Co., 1971), p. 54, FIG. 3.8.
*Digital Recording*, Digital Recording Co. of Wilton, Conn.

Primary Examiner—Jon W. Henry
Attorney, Agent, or Firm—Benoit Law Corporation

[57] ABSTRACT

Methods and apparatus for transferring information relative to a recording medium bend the medium about a first axis and move an information transfer stimulus in an arc over such bent medium about a second axis laterally offset from and extending at an angle to the first axis. These methods and apparatus impart to the bent medium a wave-shaped configuration for accommodating the mentioned arc in a perpendicular plane through the second axis. The wave-shaped configuration may be imparted to the medium with the aid of a guide or roller having a wave-shaped contour.

32 Claims, 6 Drawing Figures

INFORMATION TRANSFERRING SYSTEMS OPERATING ON A RECORDING MEDIUM

BACKGROUND OF THE INVENTION

1. Field of the Invention

The subject invention relates to methods and apparatus for transferring information, such as information recording, writing, reproducing or reading methods and apparatus of an optical, magnetic or other type, and to components for such apparatus, including, for instance, rollers and recording medium guides, and to methods for making same.

2. Disclosure Statement

The disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments subsequent in time or priority.

The expediency of bending a recording medium for recording and playback purposes has long ago been recognized as may, for instance, be seen from U.S. Pat. No. 1,735,335, by F. H. Owens, and U.S. Pat. No. 1,865,055, by T. W. Case, where photographic film is shown as bent over a drum or curved guide for information transducing purposes, and is held in its bent condition by curved finger or track elements. Such an approach in practice has been feasible for relatively low recording medium speeds and in processes where the information transducing function concerns only part of the width of the recording medium.

A better utilization of the recording medium was obtained with the use of mechanical scanners, such as those illustrated in U.S. Pat. No. 3,314,075, by C. H. Becker et al, showing a coherent light beam recorder in which a recording medium is advanced in an arc about a cylindrical space which contains rotating scanner equipment similar in principle to the rotating heads in a helical scan magnetic tape recorder. That approach, however, has serious design limitations in that the scanning feature is in effect restricted to radially acting equipment and in that the recording medium, though having to be accurately guided and supported during advancement through an arc, at the same time has to be kept free for exposure to the rotating scanner.

A similar approach, resembling transverse scanning in magnetic tape recording, is apparent from U.S. Pat. No. 3,463,882, by R. J. Herbold, and U.S. Pat. No. 3,874,621, by L. R. Blair et al, where an advancing recording medium is bent transversely to its longitudinal direction for transverse scanning purposes by rotating mirror optics.

In practice, that approach requires an arcuate supporting and medium shaping structure, such as a vacuum platen, that is bound to exert considerable friction on the advancing medium. Where a concave air platen is employed to reduce friction in the manner of an air bearing, an air jet system has to be utilized, which tends to introduce disturbing factors, such as blown contaminants and moisture or excessive desiccation of the recording medium.

A compromise solution is apparent from the book THE PRINCIPLES AND PRACTICE OF FACSIMILE COMMUNICATION by Daniel M. Costigan (Chilton Book Company, 1971), p. 54, FIG. 3.8, where a facsimile system is shown in which a record is concavely curved and advanced by a lead screw mechanism relative to a revolving lens turret which thus scans the advancing record continually from side to side. In practice, that approach is limited to records of relatively short length, requiring special manipulations for the placement and removal of each record or recording medium. Attempts at mechanizing such requisite operations lead to complex systems as may be seen from U.S. Pat. No. 3,654,624, by C. H. Becker et al, where a rotating drum and galvanometer-type scanner system have been proposed for the purpose of handling a plurality of recording material strips which have to be specially indexed and retrieved.

A system designed for flat recording media and records is, for instance, apparent from U.S. Pat. No. ',501,586, by J. T. Russell, which employs rotating optical scanners.

According to one disclosed approach, a rotating scanner mirror is also axially moved in an effort to provide compensation for the flatness of the record. This in practice leads to a relatively complex scanner structure. Another disclosed approach equips the flat record or recording medium with a concave field corrector plate in the form of a negative lens. This in practice tends to cause light and reflection losses.

A somewhat similar approach appears from U.S. Pat. No. 4,168,506, by S. L. Corsover, in which a flat field lens has been proposed for focusing a scanning beam from a rotating polyhedric mirror onto a transversely scanned film which is advanced along a pair of cylinder guides that are curved transversely to the scanning direction. As that proposal points out, a suitable field lens needs to be composed of a plurality of lens elements.

Where a flat recording medium is held stationary during scanning with a rotating scanner, such scanner structure could be displaced relative to the stationary recording medium. However, displacement of a rotating scanner in parallel to its axis of rotation poses considerable problems in terms of equipment and tracking accuracy.

SUMMARY OF THE INVENTON

It is a general object of this invention to overcome or alleviate the problems and to meet the needs expressed or implicit in the above disclosure statement or in other parts hereof.

It is a related object of this invention to provide improved information recording, writing, reproducing, reading or processing methods and apparatus.

It is a germane object of this invention to provide improved methods and apparatus for transferring information.

It is also an object of this invention to provide improved recording medium transport systems.

It is a further object of this invention to provide improved guides and rollers for sheet-like media, and to provide methods for making same.

Other objects of the invention will become apparent in the further course of this disclosure.

From a first aspect thereof, the subject invention resides in a method of transferring information relative to a recording medium and, more specifically, resides in the improvement comprising in combination the steps of bending the medium about a first axis, moving an information transfer stimulus in an arc over such bent medium about a second axis laterally offset from and extending at an angle to the mentioned first axis, imparting to the bent medium a wave-shaped configuration for accommodating the mentioned arc in a perpendicular plane through the second axis, and transferring information relative to the medium with the aid of the moving stimulus.

From another aspect thereof, the subject invention resides in a method of transferring information relative to a light-responsive medium and, more specifically, resides in the improvement comprising in combination the steps of providing a light beam for transferring information relative to the medium, providing lenses in a circular plane for sequentially projecting the light beam onto the medium, bending the medium about a first axis, moving the light beam in an arc over the bent medium by rotating the light beam projecting lenses in the mentioned circular plane about a second axis laterally offset from and extending at an angle to the first axis, imparting to the bent medium a wave-shaped configuration for maintaining a constant distance between the medium and sequentially each of the rotating lenses during movement of the light beam in the mentioned arc, and transferring information relative to the medium with the moving light beam.

From another aspect thereof, the subject invention resides in a method of transferring information relative to a recording medium and, more specifically, resides in the improvement comprising in combination the steps of providing a cylindrical guide, angularly moving the guide about a first axis, rotating a pointed cutter in a circle about a second axis laterally offset from and extending at an angle to the first axis, contacting the guide with the pointed cutter, machining the guide with said rotating pointed cutter in a circular plane extending through part of the guide, carrying out the machining over a periphery of the guide, stressing the medium into intimate contact with a contour on the periphery of the machined guide, moving an information transfer stimulus about the second axis in an arc over the stressed medium, and transferring information relative to the medium with the aid of the moving stimulus.

From another aspect thereof, the subject invention resides in a method of transferring information relative to a recording medium and, more specifically, resides in the improvement comprising in combination the steps of providing a guide for the medium with a bulge and a pair of valleys having the bulge therebetween, curving the bulge and valleys about a first axis, stressing the medium into intimate contact with the curved bulge and valleys, moving an information transfer stimulus in an arc over the stressed medium, and transferring information relative to the stressed medium with the aid of the moving stimulus.

From another aspect thereof, the subject invention resides in a method of making a guide for a sheet-like medium and, more specifically, resides in the improvement comprising in combination the steps of providing a cylindrical guide, angularly moving the guide, rotating a pointed cutter in a circle coinciding with part of and extending beyond the guide, contacting the guide with the pointed cutter, and machining the guide with the rotating pointed cutter in a circular plane extending through part of the guide.

From another aspect thereof, the subject invention resides in a method of making a guide for advancing a sheet-like medium and, more specifically, resides in the improvement comprising in combination the steps of providing the guide with a bulge and a pair of valleys having the bulge therebetween, and curving the bulge and valleys about a predetermined axis.

From another aspect thereof, the subject invention resides in apparatus for transferring information relative to a recording medium with the aid of an information transfer stimulus and, more specifically, resides in the improvement comprising, in combination, means for bending the medium about a first axis, means for moving the stimulus in an arc over the bent medium about a second axis laterally offset from the first axis, means for imparting to the bent medium a wave-shaped configuration for accommodating the arc in a perpendicular plane through the second axis, and means for transferring information relative to the medium with the aid of the moving stimulus.

From another aspect thereof, the subject invention resides in apparatus for transferring information relative to a light-responsive medium and, more specifically, resides in the improvement comprising, in combination, means for transferring information relative to the medium, including a light beam and lenses in a circular plane for sequentially projecting the light beam onto the medium, means for bending the medium about a first axis, means for moving the light beam in an arc over the bent medium, including means coupled to the information transferring means for rotating the light beam projecting lenses in the mentioned circular plane about a second axis laterally offset from the first axis, and means for maintaining a constant distance between the medium and sequentially each of the rotating lenses during movement of the light beam in the mentioned arc, including means for imparting to the bent medium a wave-shaped configuration.

From another aspect thereof, the subject invention resides in apparatus for transferring information relative to a recording medium with the aid of an information transfer stimulus and, more specifically, resides in the improvement comprising, in combination, guiding means for the medium made by a method including the steps of providing a cylindrical guide, angularly moving the guide about a first axis, rotating a pointed cutter in a circle about a second axis laterally offset from the first axis, contacting the guide with the pointed cutter, machining the guide with the rotating pointed cutter in a circular plane extending through part of the guide, and carrying out the machining over a peripheral region of the guide, means for stressing the medium into intimate contact with a contour of the machined guide, and means for transferring information relative to the medium, including means for moving an information transfer stimulus about the second axis in an arc over the stressed medium on the guide.

From another aspect thereof, the subject invention resides in apparatus for transferring information relative to a recording medium and, more specifically, resides in the improvement comprising, in combination, a guide for the medium having a bulge and a pair of valleys having the bulge therebetween and being curved about a first axis, means for stressing the medium into intimate contact with the curved bulge and valleys, means for moving an information transfer stimulus in an arc over the stressed medium, and means for transferring information relative to the stressed medium with the aid of the moving stimulus.

From another aspect thereof, the subject invention resides in a guide structure for a sheet-like medium, made by a method comprising in combination the steps of providing a cylindrical guide, angularly moving the guide, rotating a pointed cutter in a circle coinciding with part of and extending beyond the guide, contacting the guide with the pointed cutter, and machining the guide with the rotating pointed cutter in a circular plane extending through part of the guide.

Any mentioning of specific combinations, elements or features in the subject Summary of the Invention is not intended to limit the interpretation of any claim to such summaries or to exclude coverage of other combinations, elements and features herein disclosed.

BRIEF DESCRIPTION OF THE DRAWINGS

The invention and its various objects and aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
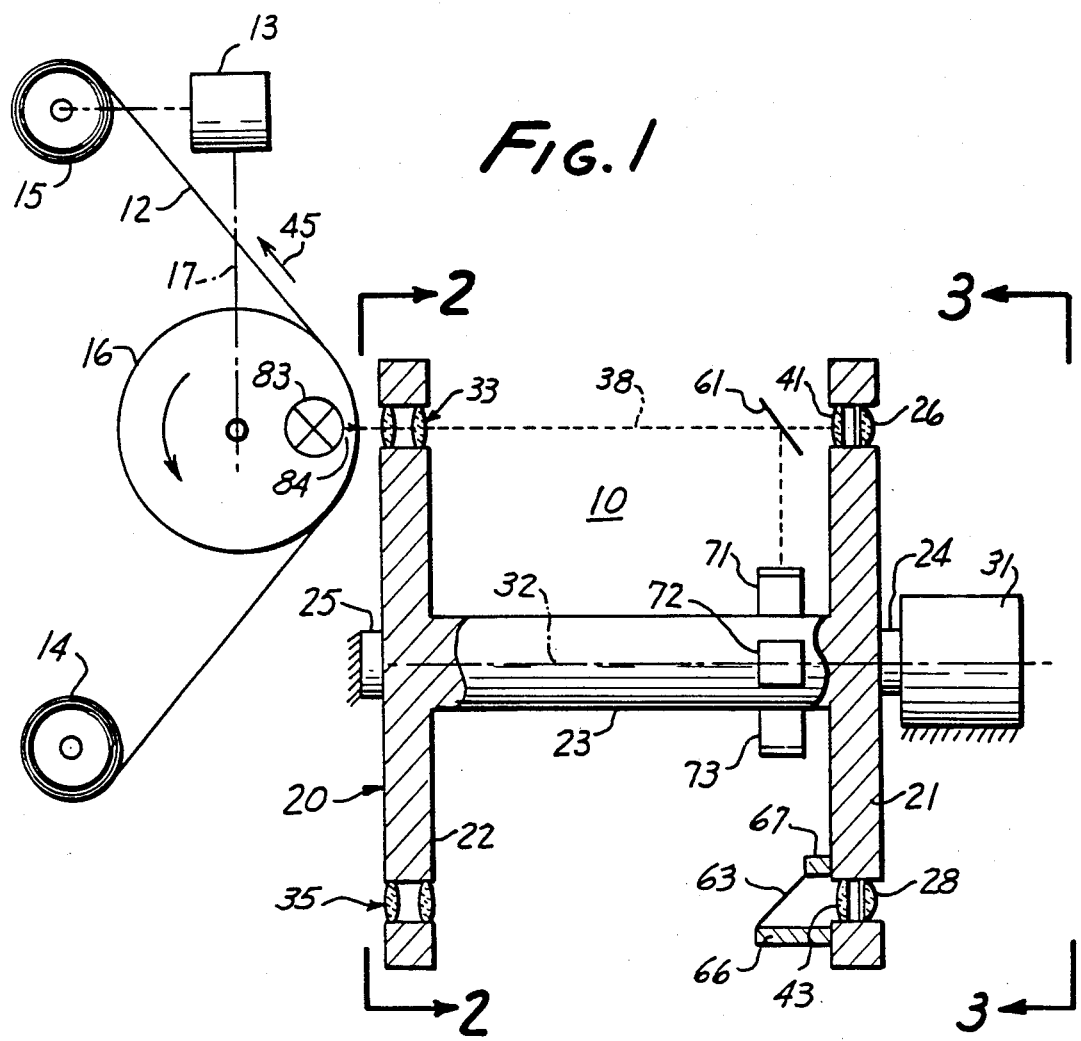
FIG. 1 is a somewhat diagrammatic side view, partially in section, of an information recording and playback apparatus in which the subject invention may be practiced.

The information recording and playback apparatus 10 illustrated in FIG. 1 serves to transfer information relative to a recording medium 12 which is advanced by a recording medium drive 13 from a supply roller 14 to a takeup roller 15 via a drum 16 which, as indicated by a phantom line 17, is also driven.

The information transferring apparatus 10 includes a rotatable or rotating scanner 20 containing the optics and light sources as more fully disclosed below. In the embodiment shown in FIG. 1, the scanner comprises two wheels or discs 21 and 22 supported by a common shaft 23 and journaled by air bearings 24 and 25.

Figure 3:
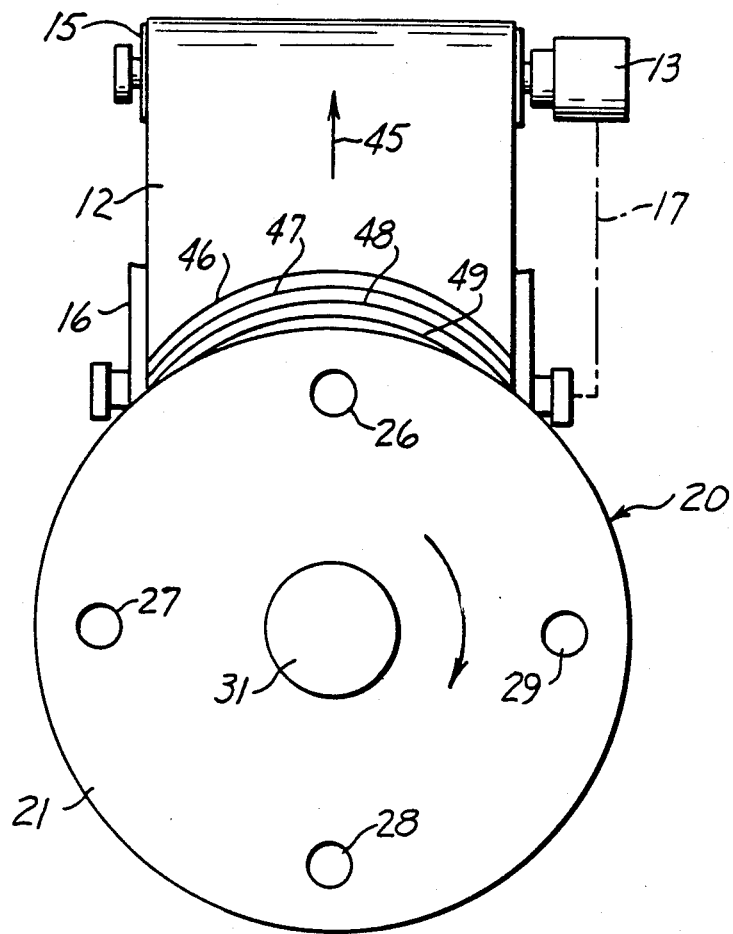
FIG. 3 is a view taken on the line 3—3 in FIG. 1.

As seen in FIGS. 1 and 3, the scanner wheel 21 contains or mounts a series of light sources 26, 27, 28 and 29 and, in conjunction with a scanner drive 31, serves as a means for rotating the series of light sources 26 to 29 about an axis 32 extending at an angle to the recording medium 12.

The second scanner wheel 22 serves to rotate between the light sources 26 and 29 and the recording medium 12 a series of optical focusing devices 33, 34, 35 and 36 in synchronism with the sources 26 to 29 about the axis 32. A series of optical focusing devices 33 to 36 is thus provided between the light sources 26 and 29 and the medium 12, and the second scanner wheel 22 serves as a means for rotating this series of optical focusing devices 33 to 36 in synchronism with the sources 26 to 29 about the axis 32, as just mentioned.

Beams of light, one of which is shown in FIG. 1 at 38, are projected from the rotating sources 26 to 29 through the rotating focusing devices 33 to 36 sequentially to the medium 12. Each light source 26 to 29 may have a further lens system or lens associated therewith. Two of these lenses are seen in FIG. 1 at 41 and 43 for the light sources 26 and 28, and the light sources 27 and 29 may be provided with lenses similar or identical to the lenses 41 and 43.

By way of example, these lenses 41, 43, etc. may be designed to collimate the light issued by the sources 26 to 29. A cylindrical or anamorphic design may be employed for the lenses 41, 43, etc. in case the sources 26 to 29 emit light in an ellipse or other non-circular form. For instance, if light emitting or laser diodes having an elliptical light output are employed at 26 to 29, the lenses 41, 43, etc. may be designed in a conventional manner to convert a light output of elliptical cross-section to a circular cross-section.

The focusing devices 33 to 36 and, if present, the corresponding lenses 41, 43, etc., thus serve as means for projecting beams of light 38 from the rotating sources 26 to 29 through the rotating focusing devices 33 to 36 sequentially to the medium 12. The scanner 20, with wheels 21 and 22 and drive 31 then serves as means for moving each projected beam 38 relative to the medium 12.

In this manner, each light beam 38, etc. scans the recording medium 12 in an arc. The recording medium itself is advanced, as indicated by the arrow 45, so that the light beams 38, etc. of the rotating light sources 26 to 29 scan the recording medium 12 in a series of arcs, some of which are indicated at 46, 47, 48 and 49 in FIG. 3.

In practice, information is transferred with the aid of any projected moving beam 38, etc. relative to the medium 12. In this respect, the medium 12 may be advanced continuously, in similarity to the magnetic recording tape in a transverse scan or slant track tape recorder, or intermittently, in similarity to the film in a typical motion picture camera or projector.

The speed or rate of advance of the medium 12 is several times lower than the rate of rotation of the scanner 20. A similarity to magnetic transverse scan or slant track video or other recording may be noted in this respect. If the recording medium 12 is advanced intermittently, the steps of intermittent advance are such that the tracks 46, 47, 48, 49, etc. are sufficiently spaced from each other to avoid mutual interference, while being packed as closely as possible together for maximum recording density.

For increased recording density, laser light sources may be employed at 26 to 29. It is a particular advantage of the subject apparatus that it enables the use of diode lasers, which are small, light, economical in power usage and capable of modulation by electrical input variation. Since typical diode lasers require only about an ampere or less of energization current at only a few volts, they may be fed from a supply similar to that use for low-level transistor electronics.

The recording medium 12 may be of a material in which data are recorded by melting or ablation, as is already conventional with infrared and thermal recording.

In this respect, Curie point and similar magnetothermal recording could be employed for a magnetic information recording effect. These melting, ablation or thermal recording techniques require, however, typically higher power energizations and outputs than, for instance, photographic methods.

Accordingly, a photographic recording method is presently preferred in the operation of the subject apparatus. The recording medium 12 may thus be a photographic film which is dye-sensitized or otherwise adapted to match the emission wavelength of the light sources 26 to 29. For instance, if diode lasers emitting in the far red or near infrared are employed at 26 to 29, the recording medium 12 may be a photographic film including a high-resolution silver halide material which is dye-sensitized to the far red or near infrared spectrum.

Figure 4:
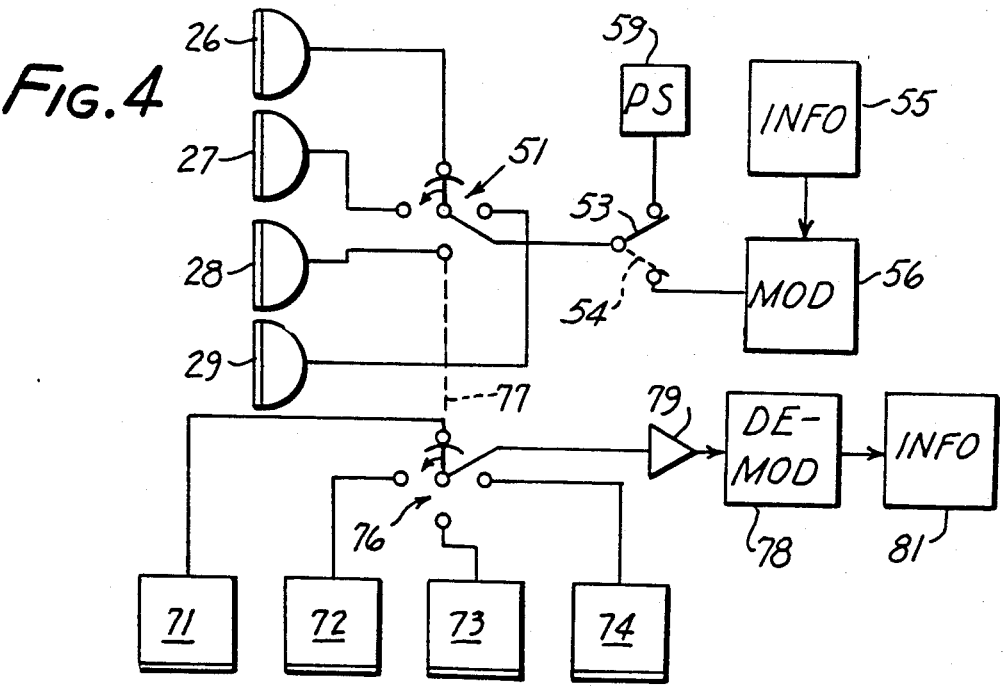
FIG. 4 is a circuit diagram of electrical equipment which may be employed in the operation of the apparatus of FIGS. 1 to 3.

In similarity to transverse scan or slant track recording, slip rings, rotary transformers and similar devices may be employed to energize the rotating recording devices 26 to 29. By way of example, a rotating slip ring device 51 is shown in FIG. 4 for applying modulated energizing current sequentially to the light sources 26 to 29. By way of example, the rotary slip ring device may be coupled to or rotate with the scanner 20. The input of the slip ring device 51 is connected to a double-throw switch 53 which has a solidly illustrated position for reading or playback and an alternative position indicated by a dotted line 54 for writing or recording.

In the alternative position 54, the switch 53 connects an information source 55 and modulator 56 to the slip ring device 51 for sequential distribution of modulated energizing current to the light sources 26 to 29. By way of example, the information source 55 may be a source of digital data such as a video camera or system with digital output, with which a carrier or energizing current is modulated at 56 in a manner that may be conventional as such. In practice, an analog-to-digital converter (not shown) may be associated with information source 55 and a corresponding digital-to-analog converter (not shown) with the display device 81, so that information may be recorded digitally on the medium 12.

If diode lasers are employed at 26 to 29, modulation may simply take place by varying at 56 the electrical input current for the diode lasers with the information to be recorded on the medium 12.

Information or data may thus be recorded serially in arcuate tracks 46, 47, 48, 49, etc. across the recording medium or film 12 by means of the rotating scanner 20 carrying a series of objective lenses 33 to 36 and, in the embodiment shown in FIG. 1, a corresponding series of modulated light sources 26 to 29. Longitudinal motion 45 of the recording medium or film 12 distributes the successive tracks 46, 47, etc. uniformly along its length. As in the case of transverse scan and slant track recording, the tracks 46, 47, etc. may extend either across the full width or a predetermined useful portion of the recording medium 12, and a certain redundancy of information recording may be provided at or near the edges of the recording medium, in order to avoid loss of information or synchronism during recording and playback.

For optically-stored data in the trillion bit range, a flexible and continuously or intermittently advancing recording medium is required for ease of handling.

In the recording mode of the apparatus, light of any projected beam 38, etc., is modulated with information, such as with the aid of the modulator 56 shown in FIG. 4. If a slip ring device 51 or similar distributor is employed, the output light beams of the light sources 26 to 29 are modulated sequentially with information which is thereby sequentially recorded in the tracks 46, 47, 48, 49, etc. In this manner, the information is recorded on the medium 10 so that it can be read therefrom.

Reading or playback of the recorded information is not restricted to any method or technique herein disclosed. However, the same scanner, typically with additions or modifications, may be employed according to a preferred mode of operation of the apparatus for both information recording and playback.

By way of example, the switch 53 may be actuated to its solidly illustrated position shown in FIG. 4 for the playback mode. In that position, the switch 53 connects the slip ring device or distributor 51 to a power supply (PS) 59. This power supply, by way of example, sequentially provides the light sources 26 to 29 with a continuous energization. If desired, such continuous energization may be applied to all light sources 26 to 29 continuously during the playback process.

In either case, the objective is to have each light source 26 to 29 emit a light beam 38, etc. which upon projection through the corresponding focusing devices 33, 34, 35 or 36 can be modulated by the information recorded in tracks 46, 47, 48 or 49 on the recording medium 12.

For playback, the scanner 20 is typically rotated and the recording medium 12 is typically advanced in the manner in which the scanner and recording medium were advanced during recording. Beams 38 et seq. emitted by energized sources 26 et seq. and projected via lens systems 41 and 33 et seq. are projected onto the recording medium 12 so as to be subject to reflection by information recorded in the tracks 46 et seq. thereof. In this manner, light of any projected beam 38 et seq. is modulated with information on the medium 12. The information-modulated light thus provided may be reflected and projected back through the optical focusing devices 33 et seq. which rotate between the sources 26 et seq. and the medium 12 in synchronism with the light sources.

In this respect, it should be recognized that the medium 12 for reading or playback purposes need not necessarily be the same medium on which the information being played back was previously recorded. Rather, information may, for instance, be read from a print or duplicate of an original recording. Accordingly, the expression "recording medium" herein employed is intended to be broad enough to cover information records along with recording media, as appropriate in any particular context.

Figure 2:
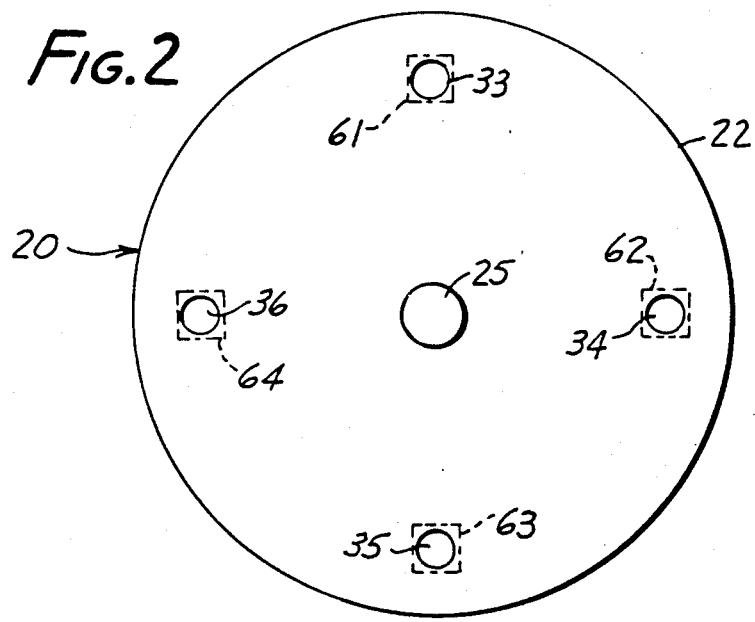
FIG. 2 is a view taken on the line 2—2 in FIG. 1.

As shown in FIGS. 1 and 2, a series of light reflecting devices 61, 62, 63 and 64 is rotated in synchronism with the focusing devices 33, 34, 35 and 36 about the axis 32. As shown for the reflective device 63 in FIG. 1, appropriate supports 66 and 67 may be employed for mounting the reflecting device at the appropriate locations and angles. Preferably, the reflecting devices 61 to 64 are beam splitters which permit passage of an unmodulated beam from the corresponding light source 26, 27, 28 or 29 through the corresponding focusing device 33, 34, 35 or 36 to the tracks 46, 47, 48 or 49 on the recording medium or record 12. If the axis 32 as shown in FIG. 1 is parallel to the beam 38 and if such beam 38 extends perpendicularly to the portion of the recording medium 12 on which it impacts, then light modulated with information on, and reflected by, the recording medium 12 will travel back along the beam 38. To this end, the scanner rotation axis 32 spatially extends at right angles to the effective surface of the recording medium.

Information-modulated and reflected light from any of the beams 38, etc. is thus projected back along the particular beam through the corresponding focusing device 33, etc. onto the corresponding beam splitter 61, etc., where it is, in turn, reflected to a photosensing device for reading the played-back information. If desired, the drum 16 may be made of transmissive material for use with photographic film or a similar recording medium 12 in which the recorded information can be discerned by observation of transmitted light.

In that case, a fluorescent tube 83 or similar large-area light source may be installed in the then transmissive drum for emitting light 84 through the information record 12 for modulation by information recorded in tracks 46, 47, et seq.

Light is thus modulated with information on the medium 12 and is thereupon projected via one or more rotating reflecting devices 33, 34, 35 and 36 to one or more photosensors 71 to 74. In the illustrated preferred embodiments, a series of light reflecting devices 61 to 64 is rotated in synchronism with the focusing devices 33 to 36 about the axis 32, and information-modulated light is projected via such rotating reflecting devices to photosensing means, with such projection being preferably effected with the aid of the synchronously rotating focusing devices 33 to 36.

The circuitry illustrated in FIG. 4 may also be employed for information reading during transmissive illumination of the information record 12, except that the switch 53 may then be placed into an intermediate position in which the light sources 26 to 29 are not energized.

The recording and playback methods and apparatus according to FIGS. 1 to 4 are the invention of Mr. John H. Jacobs, of Bell & Howell Company.

In practice, the writing and reading light beams follow curved paths 46, 47, 48, etc., on the recording medium 12 wrapped on the drum 16, whereby variations in the distance between the particular region of the recording medium and the adjacent lens or lens system 33, 34, 35 or 36 occur, particularly if the drum is cylindrical. These variations of focal distance vary as a function of drum diameter and number of lenses 33, 34, etc., on the scanner wheel 22.

According to the subject invention, focal variations are reduced by imparting to the recording medium or record 12 a wave-shaped configuration for accommodating the arc of the information recording or reading track 46, 47, 48, etc., in a perpendicular plane through an axis of rotation 32 of the scanner 20. By way of example, the drum 16 may be given a wave-shaped configuration 91 for, in turn, imparting a desired corresponding configuration to the advancing recording medium 12 when proceeding over part of the circumference of the drum 16.

Figure 5:
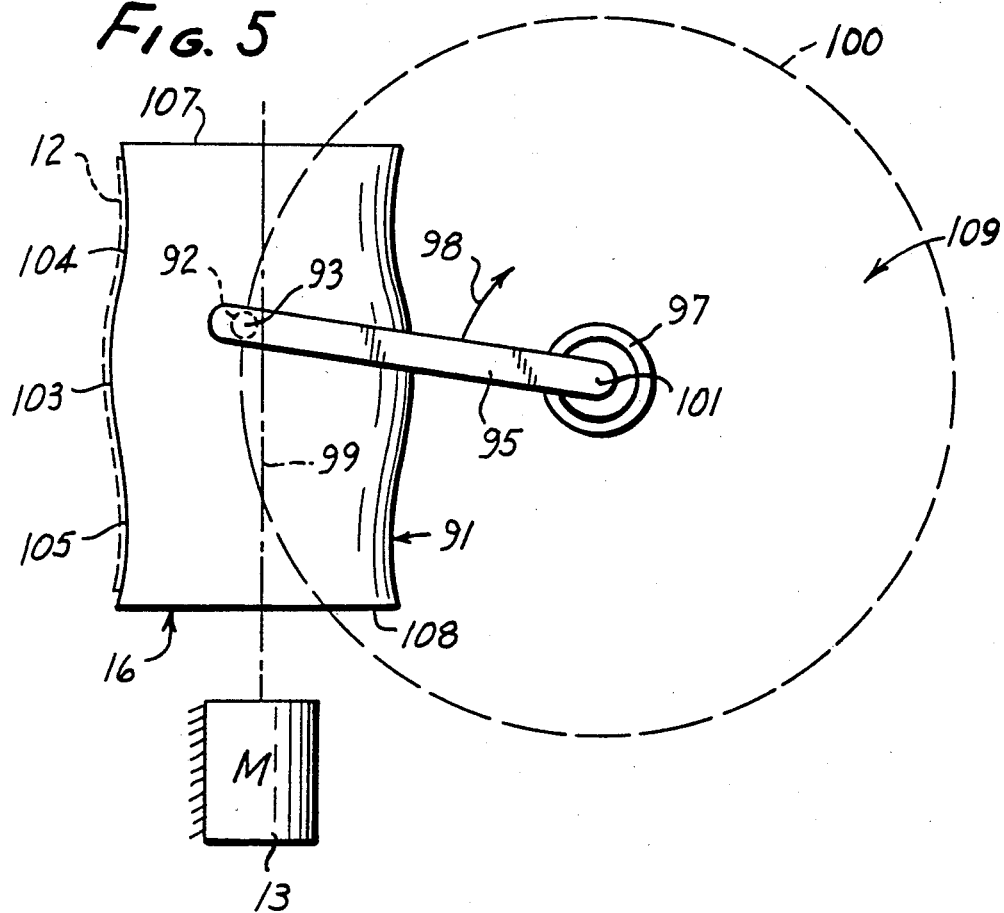
FIG. 5 is a somewhat diagrammatic top view of apparatus for preparing a carrier drum, and of a carrier drum prepared, according to a preferred embodiment of the subject invention for use in any of the apparatus of FIGS. 1 to 7.
Figure 6:
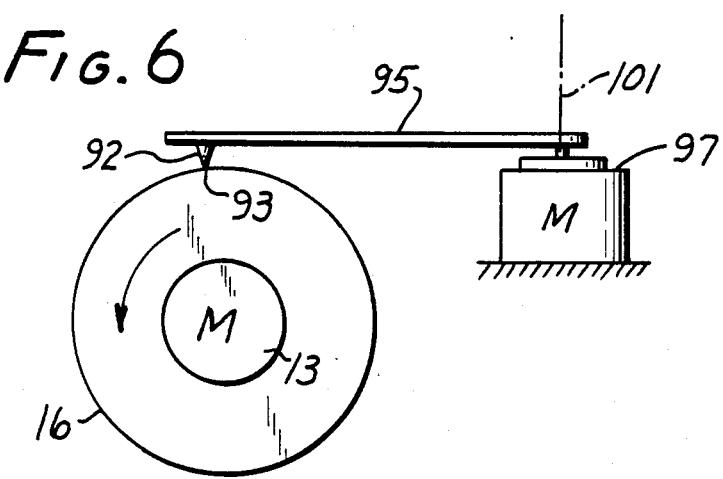
FIG. 6 is a side view of the apparatus of FIG. 5.

FIGS. 5 and 6 show a method according to a preferred embodiment for imparting a desired wave-shaped configuration 91 to the outer surface of the drum 16. By way of example, an initially cylindrical drum is machined with a single-point cutter 92 having a cutting point 93 analogous to the focal spot of any lens or lens system 33 to 36 traversing the medium 12 on the drum 16.

In FIGS. 5 and 6, the cutter 92 depends from a mounting arm 95. The cutter 93 is attached to the underside of a free end of the mounting arm 95, with the cutting point 93 contacting the circumference of the drum 16. A motor 97 rotates the arm 95 and cutter 92, as indicated by an arrow 98.

Motor 13 rotates the drum 16 about a first axis 99, while motor 97 rotates the pointed cutter 93 in a circle 100 about a second axis 101 laterally offset from and extending at an angle to the first axis. The cutter 92 contacts the originally cylindrical drum 16 with its cutter point 93 and the drum 16 is thus machined with the rotating pointed cutter 92 in a circular plane extending through the circle 100 and through part of the originally cylindrical drum 16.

This machining operation is carried out over the periphery of the drum until the desired wave-shaped contour 91 has been achieved. In practice, this may, of course, be accomplished in several runs or in any other desired manner.

The drum 16 thus acquires a peripheral configuration having a bulge 103 and a pair of valleys 104 and 105 having the bulge 103 situated therebetween. The recording medium or record 12 is stressed into intimate contact with such contour 91 of the periphery of the machined drum, and an information transfer stimulus, such as a writing or reading beam, is moved about the second axis 32 or 101 in an arc 100 over the stressed medium, with information being thereby transferred relative to the medium with the aid of the moving stimulus 38, such as for writing or reading purposes.

The drum 16 with contour 91 may be employed in the apparatus of FIGS. 1 to 4 or in any other information recording or reading or other rotary scanner apparatus in which a recording or record film or medium proceeds via or is located on a drum for scanning thereon. In that case, the first axis 99 is the axis of rotation of the drum 16, while the second axis 101 is in effect the axis 32 of the scanner, such as the scanner 20, and the circle 100 shown in FIGS. 5 and 6 corresponds to the circle through which the lenses or lens sets 33 to 36 or equivalent scanner elements or light beams rotate during operation of the scanner.

In these and other cases, the subject invention provides methods and apparatus for transferring information relative to a recording medium, 12 by bending the medium about a first axis 99, such as by means of rollers 14 and 15 and drum 16, moving an information transfer stimulus 38 in an arc 46, 47, etc. over the bent medium about a second axis 32 laterally offset from and extending at an angle, such as a right angle, to the first axis, imparting to the bent medium 12 a wave-shaped configuration, such as by means of a wave-shaped configuration 91 of the drum 16, for accommodating said arc in a perpendicular plane through the second axis 32 and transferring information relative to the medium 12 with the aid of the moving stimulus 38.

Methods and apparatus for transferring information relative to a light-responsive medium 12 provide a light beam 38 for transferring information relative to the medium, provide lenses 33 to 36 in a circular plane for sequentially projecting the light beam onto the medium, again bend the medium 12 about a first axis 99, move the light beam in an arc over the bent medium by rotating the light beam projecting lenses in that circular plane about a second axis 32 laterally offset from and extending at an angle to the first axis, impart to the bent medium 12 a wave-shaped configuration 91 for maintaining a constant distance between that medium and sequentially each of the rotating lenses 33 to 36 during movement of the light beam in said arc, and transfer information relative to the medium 12 with the moving light beam 38.

The wave-shaped configuration 91 is provided with a pair of valleys 104 and 105 having a wave crest or bulge 103 therebetween and the medium 12 is stressed into intimate contact with said wave-shaped contour 91 to effect the bending of the medium and the impartation of the wave-shaped configuration 91 to the bent medium. The bent medium is advanced and the wave-shaped configuration continually imparted to such bent medium. The information transfer stimulus or light beam 38 is moved in successive arcs over the bent, wave-shaped medium.

According to an embodiment of the invention, the maximum radius of the drum 16 at the bulge 103 is equal to the radii of the drum at the circular end faces 107 and 108. The medium 12 is stressed within its elastic limit so that it resumes its regular shape on the takeup roller 15.

Methods according to preferred embodiments of the subject invention provide a cylindrical guide, such as the drum 16 originally having a cylindrical shape, angularly move such guide about a first axis 99, rotate a pointed cutter 92 in a circle 100 about a second axis 101 laterally offset from and extending at an angle to the first axis 99, contact the guide with the pointed cutter, machine the guide with the rotating pointed cutter 92 in a circular plane, such as the plane 109 of the circle 100, extending through part of the guide 16, and carrying out such machining over a periphery of the guide 16.

The medium 12 may thereafter be stressed into intimate contact with a contour 91 on the periphery of the machined guide 16. An information transfer stimulus 38 may then be moved about the second axis 32 in an arc over the stressed medium 12 and information may be transferred relative to the medium 12 with the aid of the moving stimulus.

The second axis 101 may be arranged in a plane extending at right angles to the first axis 99.

The drum 16 may be machined on a lathe, which spins the drum and cuts thereacross with a cutter arm.

According to a preferred embodiment of the subject invention, the medium guide 16 is a solid revolution about an axis 99 of a curved line having the wave-shaped configuration 91. The wave-shaped configuration corresponds to the loci of imaging or recording points provided by the rotating lens sets 33 to 36 or similar scanner and being in an arc at a time along a plane.

In practice, stationary as well as rotary guides are within the scope of the subject invention, as are guides which do not represent a solid of revolution closed in itself. In general terms, a guide 16 for the medium 12 may be provided with a bulge 103 and a pair of valleys 104 and 105 having the bulge 103 therebetween and such bulge and valleys may be curved about a first axis 99. Again, the medium 12 is stressed into intimate contact with the bulge and valleys and an information transfer stimulus is moved in an arc over such stressed medium for a transferring of information relative to such stressed medium.

A more specific embodiment of the invention provides a roller 16 having a first or roller axis 99, and provides the roller with a wave-shaped contour 91 including a circumferential bulge 103 and a pair of circumferential valleys 104 and 105 having the bulge 103 therebetween. The medium 12 may thereafter be stressed into intimate contact with said wave-shaped configuration 91.

Various servo, track and focus controls may be employed or implemented in the apparatus of the subject invention. Reference may in this respect be had to a publication entitled DIGITAL RECORDING, by Digital Recording Co. of Wilton, Conn., and to the above mentioned patents, including those by Becker et al and by Russell. If desired, acousto-optical devices may be employed for servo tracking and focus control purposes. Acousto-optical devices for similar purposes have been disclosed in U.S. Pat. No. 3,324,478, by John H. Jacobs, issued June 6, 1967 and assigned to the subject assignee, and in U.S. Pat. No. 3,851,951, by J. H. Eveleth, issued Dec. 3, 1974, for high-resolution laser beam recorder with self-focusing acousto-optical scanner and U.S. Pat. No. 3,962,688, by E. G. N. Westerberg, issued June 8, 1976, and disclosing acousto-optical beam modulation providing lateral fine adjustment.

Various modifications and variations within the spirit and scope of the subject invention and equivalents thereof will suggest themselves or become apparent to those skilled in the art from the subject extensive disclosure.

I claim:

1. In a method of transferring information relative to a recording medium, the improvement comprising in combination the steps of:

bending said medium about a first axis;
moving an information transfer stimulus in an arc over said bent medium about a second axis laterally offset from and extending at an angle to said first axis;
imparting to said bent medium a wave-shaped configuration for accommodating said arc in a perpendicular plane through said second axis; and
transferring information relative to said medium with the aid of said moving stimulus.

2. A method as claimed in claim 1, wherein:
said wave-shaped configuration is provided with a pair of valleys having a wave crest therebetween.

3. A method as claimed in claim 1, including the steps of:

providing a roller having a roller axis
providing said roller with a wave-shaped contour including a circumferential bulge and a pair of circumferential valleys having said bulge therebetween;
locating said roller with said roller axis extending along said first axis; and
stressing said medium into intimate contact with said wave-shaped configuration.

4. A method as claimed in claim 1, including the steps of:

providing a guide for said medium;
providing said guide with a wave-shaped contour including a bulge and a pair of valleys having said bulge therebetween;
curving said bulge and valleys about said first axis; and
stressing said medium into intimate contact with said wave-shaped contour to effect said bending of the medium and said impartation of said wave-shaped configuration to the bent medium.

5. A method as claimed in claim 1, including the steps of:
advancing and continually inparting to said bent medium said wave-shaped configuration; and
moving said information transfer stimulus in successive arcs over said bent, wave-shaped medium.

6. In a method of transferring information relative to a light-responsive medium, the improvement comprising in combination the steps of:
providing a light beam for transferring information relative to said medium;
providing lenses in a circular plane for sequentially projecting said light beam onto said medium;
bending said medium about a first axis;
moving said light beam in an arc over said bent medium by rotating said light beam projecting lenses in said circular plane about a second axis laterally offset from and extending at an angle to said first axis;
imparting to said bent medium a wave-shaped configuration for maintaining a constant distance between said medium and sequentially each of said rotating lenses during movement of said light beam in said arc; and
transferring information relative to said medium with said moving light beam.

7. A method as claimed in claim 6, wherein:
said wave-shaped configuration is provided with a pair of valleys having a wave crest therebetween.

8. A method as claimed in claim 6, including the steps of:
providing a roller having a roller axis;
providing said roller with a wave-shaped contour including a circumferential bulge and a pair of circumferential valleys, having said bulge therebetween;
locating said roller with said roller axis extending along said first axis; and
stressing said medium into intimate contact with said wave-shaped configuration.

9. A method as claimed in claim 6, including the steps of:
providing a guide for said medium;
providing said guide with a wave-shaped contour including a bulge and a pair of valleys having said bulge therebetween;
curving said bulge and valleys about said first axis; and
stressing said medium into intimate contact with said wave-shaped contour to effect said bending of the medium and said impartation of said wave-shaped configuration to the bent medium.

10. A method as claimed in claim 6, including the steps of:
advancing and continually imparting to said bent medium said wave-shaped configuration; and
moving said information transfer stimulus or light beam in successive arcs over said bent, wave-shaped medium.

11. In a method of transferring information relative to a recording medium, the improvement comprising in combination the steps of:
providing a cylindrical guide;
angularly moving said guide about a first axis;
rotating a pointed cutter in a circle about a second axis laterally offset from and extending at an angle to said first axis;
contacting said guide with said pointed cutter;
machining said guide with said rotating pointed cutter in a circular plane extending through part of said guide;
carrying out said machining over a periphery of said guide;
stressing said medium into intimate contact with a contour on the periphery of said machined guide;
moving an information transfer stimulus about said second axis in an arc over said stressed medium; and
transferring information relative to said medium with the aid of said moving stimulus.

12. A method as claimed in claim 11, wherein:
said guide is machined with said pointed cutter to have a wave-shaped contour.

13. A method as claimed in claim 11, wherein:
said machining of said guide is carried out over a periphery of said guide.

14. A method as claimed in claim 11, including the step of:
arranging said second axis in a plane extending at right angles to said first axis.

15. A method as claimed in claim 3, including the steps of:
providing said roller with a wave-shaped contour by:
angularly moving said roller;
rotating a pointed cutter in a circle coinciding with part of and extending beyond said roller;
contacting said roller with said pointed cutter; and
machining said roller with said rotating pointed cutter in a circular plane extending through part of said roller.

16. A method as claimed in claim 15, wherein:
said roller is angularly moved about a first axis; and
said pointed cutter is rotated about a second axis laterally offset from and extending at an angle to said first axis.

17. A method as claimed in claim 15, wherein:
said machining of said roller is carried out over a periphery of said roller.

18. A method as claimed in claim 16, including the step of:
arranging said second axis in a plane extending at right angles to said first axis.

19. In apparatus for transferring information relative to a recording medium with the aid of an information transfer stimulus, the improvement comprising in combination:
means for bending said medium about a first axis;
means for moving said stimulus in an arc over said bent medium about a second axis laterally offset from said first axis;
means for imparting to said bent medium a wave-shaped configuration for accommodating said arc in a perpendicular plane through said second axis; and
means for transferring information relative to said medium with the aid of said moving stimulus.

20. Apparatus as claimed in claim 19, wherein:
said wave-shape configuration imparting means include means for imparting to said bent medium a pair of valleys having a wave crest therebetween.

21. Apparatus as claimed in claim 19, wherein:
said imparting means include a roller having a wave-shaped contour including a circumferential bulge and a pair of circumferential valleys having said bulge therebetween and extending about said first axis, and means for stressing said medium into intimate contact with said wave-shaped contour.

22. Apparatus as claimed in claim 19, wherein:
said imparting means include a guide for said medium, having a wave-shaped contour including a bulge and a pair of valleys having said bulge therebetween and being curved about said first axis, and means for stressing said medium into intimate contact with said wave-shaped contour.

23. Apparatus as claimed in claim 19, including:
means for advancing said medium through said bending and imparting means; and
means in said moving means for moving said information transfer stimulus or light beam in successive arcs over said bent, wave-shaped medium.

24. Apparatus as claimed in claim 19, wherein said imparting means include:
a guide for said recording medium having a curved bulge; and
a pair of curved valleys having said curved bulge therebetween.

25. Apparatus as claimed in claim 24, wherein:
said curved bulge is situated midway between two lateral edges of said guide;
one of said valleys is situated between said curved bulge and one of said edges; and
the other of said valleys is situated between said curved bulge and the other of said edges.

26. Apparatus as claimed in claim 24, wherein:
said curved bulge and valleys jointly have a wave-shaped configuration.

27. Apparatus as claimed in claim 24, wherein:
said guide is a roller; and
said curved bulge and valleys extend circumferentially about said roller.

28. In apparatus for transferring information relative to a light-responsive medium, the improvement comprising in combination:
means for transferring information relative to said medium, including a light beam and lenses in a circular plane for sequentially projecting said light beam onto said medium;
means for bending said medium about a first axis;
means for moving said light beam in an arc over said bent medium, including means coupled to said information transferring means for rotating said light beam projecting lenses in said circular plane about a second axis laterally offset from said first axis; and
means for maintaining a constant distance between said medium and sequentially each of said rotating lenses during movement of said light beam in said arc, including means for imparting to said bent medium a wave-shaped configuration.

29. Apparatus as claimed in claim 28, wherein:
said wave-shape configuration imparting means include means for imparting to said bent medium a pair of valleys having a wave crest therebetween.

30. Apparatus as claimed in claim 28, wherein:
said imparting means include a roller having a wave-shaped contour including a circumferential bulge and a pair of circumferential valleys having said bulge therebetween and extending about said first axis, and means for stressing said medium into intimate contact with said wave-shaped contour.

31. Apparatus as claimed in claim 28, wherein:
said imparting means include a guide for said medium, having a wave-shaped contour including a bulge and a pair of valleys having said bulge therebetween and being curved about said first axis, and means for stressing said medium into intimate contact with said wave-shaped contour.

32. Apparatus as claimed in claim 28, including:
means for advancing said medium through said bending and imparting means; and
means in said moving means for moving said information transfer stimulus or light beam in successive arcs over said bent, wave-shaped medium.

* * * * *